(12) United States Patent
Bailey

(10) Patent No.: US 6,464,278 B2
(45) Date of Patent: Oct. 15, 2002

(54) MOTOR VEHICLE TAIL GATE

(76) Inventor: David W. Bailey, 40 Goldenrod La., Beaver Dam, KY (US) 42320

( * ) Notice: Subject to any disclaimer, the term of this patent is extended or adjusted under 35 U.S.C. 154(b) by 0 days.

(21) Appl. No.: 09/737,083

(22) Filed: Dec. 14, 2000

(65) Prior Publication Data

US 2002/0074817 A1 Jun. 20, 2002

(51) Int. Cl.⁷ .............................................. B62D 33/03
(52) U.S. Cl. ....................................... 296/57.1; 296/50
(58) Field of Search ....................... 296/50, 57.1, 26.08, 296/26.09, 26.11, 37.14

(56) References Cited

U.S. PATENT DOCUMENTS

| | | |
|---|---|---|
| 2,852,303 A | 9/1958 | Hopson |
| 2,872,239 A | 2/1959 | Bowness et al. |
| 3,004,790 A | 10/1961 | Mayer |
| 3,010,760 A | 11/1961 | Trautmann |
| 4,580,828 A | 4/1986 | Jones |
| 4,813,842 A | 3/1989 | Morton |
| 4,856,840 A | 8/1989 | Hanley |
| 4,951,991 A | 8/1990 | Haigler |
| 5,123,692 A | 6/1992 | Couvillion |
| 5,456,511 A | 10/1995 | Webber |
| 5,518,287 A | 5/1996 | Totani |
| 6,155,625 A * | 12/2000 | Felix ........................ 296/37.14 |
| 6,302,465 B1 * | 10/2001 | Faber et al. ................... 296/50 |

* cited by examiner

Primary Examiner—D. Glenn Dayoan
Assistant Examiner—Lori L. Coletta
(74) Attorney, Agent, or Firm—Carrithers Law Office; David W. Carrithers

(57) ABSTRACT

A vehicle tail gate mounted on sliding pivots wherein the channel portion of the sliding pivots are on the vehicle and have the initial entry portion thereof sloping downwardly in a direction toward the front end of the vehicle. The tail gate has two spaced apart pins (each preferably with a roller thereon) on each of opposite edges thereof and all four slide in the channels with one pair being on the sloping portion of the track thus by gravity biasing the tail gate into its retracted position in a storage compartment provided therefor under a floor of the vehicle.

35 Claims, 6 Drawing Sheets

MOTOR VEHICLE TAIL GATE

BACKGROUND OF THE INVENTION

1. Technical Field

This invention is directed to an improved slidably and pivotally mounted (sliding pivot) tail gate for a pick-up truck, station wagon, van or other motor vehicle incorporating the same.

2. Description of the Prior Art

Pick-up trucks conventionally have a tail gate mounted thereon for pivotal movement about a fixed axis adjacent the floor of the truck box (commonly referred to as the truck bed). When the tail gate is in a closed position it is upright and when driving empty with it in this position it causes a significant amount of air drag. This extra air drag can be reduced, or eliminated, by leaving the tail gate in a horizontal position. While this has the benefit of improving the fuel mileage, thereby reducing travel costs, a rearwardly protruding gate is dangerous.

Pick-up trucks are also commonly converted to recreational travel vehicles by putting on a camper unit and these have a lower portion that fits down into the box. A door at the back of the camper unit extends down to the truck box floor and this requires removing the conventional pivotally mounted tail gate and safely storing it until the camper unit is removed.

The foregoing problems are overcome by having a tailgate storage compartment on the vehicle in which the tail gate can be stowed until required in its upright position to retain cargo in the truck box. One such proposal is found in U.S. Pat. No. 4,580,828 granted Apr. 8, 1986 to C. W. Jones. In this patented device the tail gate is mounted by a pair of sliding pivots whereby the tail gate can be slid into and out of a compartment below the rear end of the truck bed and pivoted from one to the other of a horizontal and a vertical position. It will be noted the track for the sliding pivot is horizontal and thus separate additional locking mechanisms must be employed to keep the tail gate in a retracted storage position. As stated by the patentee "Suitable locking mechanisms of conventional design maybe utilized to maintain the tailgate panel in each of its three positions".

U.S. Pat. No. 3,010,760, granted Nov. 28, 1961 to P. C. Trautmann, discloses a station wagon with a retractable tail gate in which the opposed edges of the tail gate have a groove providing a track for the sliding pivot. There is a sloped floor in a storage compartment on which the tail gates rests in its retracted position. The groove has a stepped portion adjacent one end to allow the tail gate to lower below the floor of the station wagon so that it can then be slid there below into the storage compartment.

Other references uncovered in a search, but of considerably less importance than the above to the present subject, are listed below all of which are United States Patents: U.S. Pat. No. 5,456,511 granted Oct. 10, 1995 to A. Webber; U.S. Pat. No. 5,123,692 granted Jun. 23, 1992 to C. Covillion; U.S. Pat. No. 4,951,991 granted Aug. 28, 1990 to D. Haigler; U.S. Pat. No. 4,856,840 granted Aug. 15, 1989 to D. Hanley; U.S. Pat. No. 4,813,841 granted Mar. 21, 1989 to R. Morton; U.S. Pat. No. 3,004,790 granted Oct. 17, 1961 to H. Mayer; U.S. Pat. No. 2,872,239 granted Feb. 3, 1959 to G. Bowness et al; and U.S. Pat. No. 2,852,303 granted Sep. 16, 1958 to R. Hopson.

SUMMARY OF INVENTION

The present invention defines a vehicle tail gate mounted on sliding pivots within opposing aligned angled channels. The sliding pivots extend from the vehicle tail gate and have the initial entry portion thereof sloping downwardly with the channels in a direction toward the front end of the vehicle. The tail gate has two spaced apart pins (each preferably with a roller thereon) on each of opposite edges thereof and all four slide in the channels with one pair being on the sloping portion of the track thus by gravity biasing the tail gate into its retracted position in a storage compartment provided therefor under a floor of the vehicle.

More particularly, the instant invention is a tailgate and mounting assembly for disposing the tailgate in under the bed of a vehicle of a motorized vehicle. The tail gate includes a rectangular panel having a lower and upper pair longitudinal edges and a first and a second pair of opposite end edges. A first and a second pair of pins are mounted on the tail gate and project outwardly respectively from the first and second edges at a position adjacent the lower longitudinal edge. A third and a fourth pair of pins are mounted on the tailgate at a position spaced from the first pair in a direction toward the upper longitudinal edge. Finally, a pair of spaced apart pair of members mountable on the vehicle and having a pair of spaced apart aligned angled longitudinal channels slidably receive the first and second pair of pins.

A principal object of the present invention is to provide a sliding pivot tail gate that is gravity biased to its retracted storage horizontal position in a compartment therefore below a tail end portion of the vehicle.

While the tailgate of the invention is described herein in the preferred environment as being associated with a pick-up truck it is also applicable to station wagons and vans.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENTS

Figure 1:
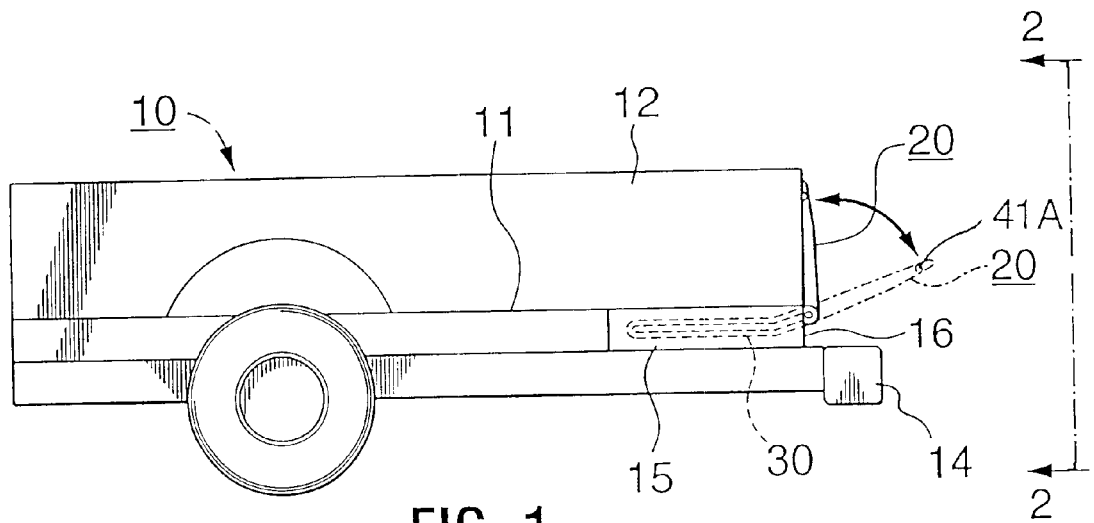
FIG. 1 is a side elevation of the rear end portion of a pick up truck having thereon a tail gate provided in accordance with the present invention.
Figure 2:
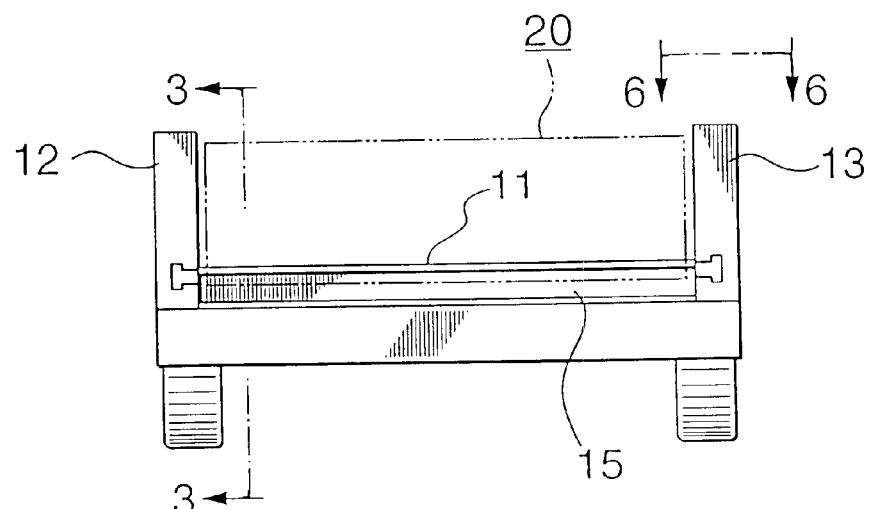
FIG. 2 is rear elevational view taken along line 2—2 of FIG. 1.
Figure 3:
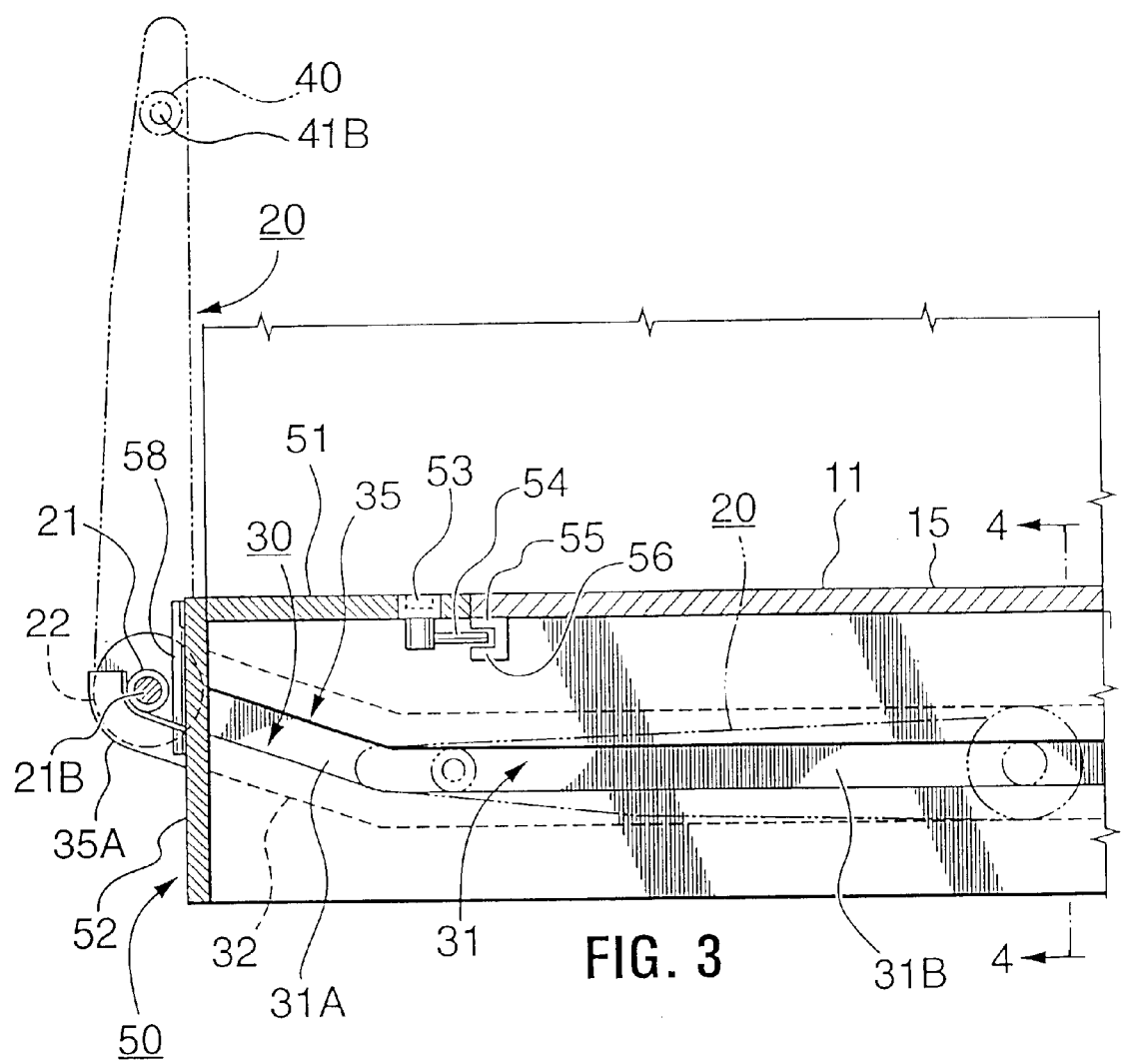
FIG. 3 is a view taken along line 3—3 of FIG. 2 but on a larger scale.

Referring to the drawings there is illustrated the rear end portion of a pick up truck 10 having a tail gate 20 mounted thereon by a sliding pivot 30 located at each of respective opposite side edges of the tail gate.

The truck box has a floor (i.e. bed) 11, a pair of spaced apart opposed vertical side walls 12 and 13, a rear bumper 14 and a tail gate storage compartment 15 located below the floor 11 and which extends forwardly from the tail end 16 of the box to receive therein the tail gate in its fully retracted horizontal position. Each sliding pivot comprises a channel 31 for a roller 21 journalled on a pin 21A secured to and projecting outwardly from an end edge of the tailgate adjacent the lower end thereof. While only the pin alone (projecting into the channel in the track) could provide the sliding pivots the roller provides for a smoother operation. Outboard of the channel 31, and communicating therewith, is a deeper second channel 32 that receives therein a circular plate 22 on the end of the roller (or mounted on the pin 21A of the roller associated therewith). The plate is larger in diameter than the roller 21 and serves as a guide for the tail gate while it is moved on the sliding pivot from one position to the other of a retracted and extended position. In the extended position the tail gate can be pivoted to an upright tail gate closed position cooperatively engaging and latching to the side walls utilizing a selected tail gate latching mechanism (central handle connecting to rods extending to hook and pin arrangement), with the sliding pivot locked in position by means to be described hereinafter.

Figure 4:
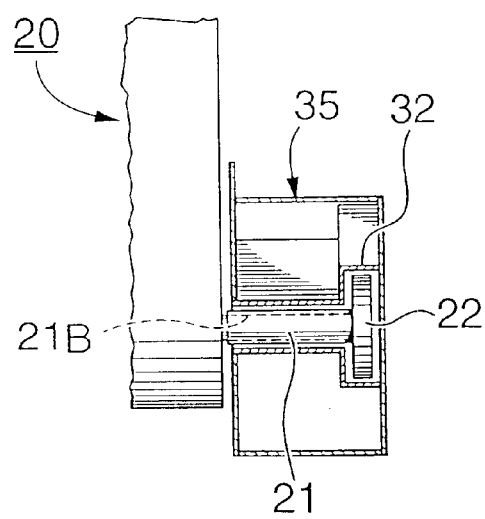
FIG. 4 is a partial sectional view taken along line 4—4 of FIG. 3.
Figure 5:
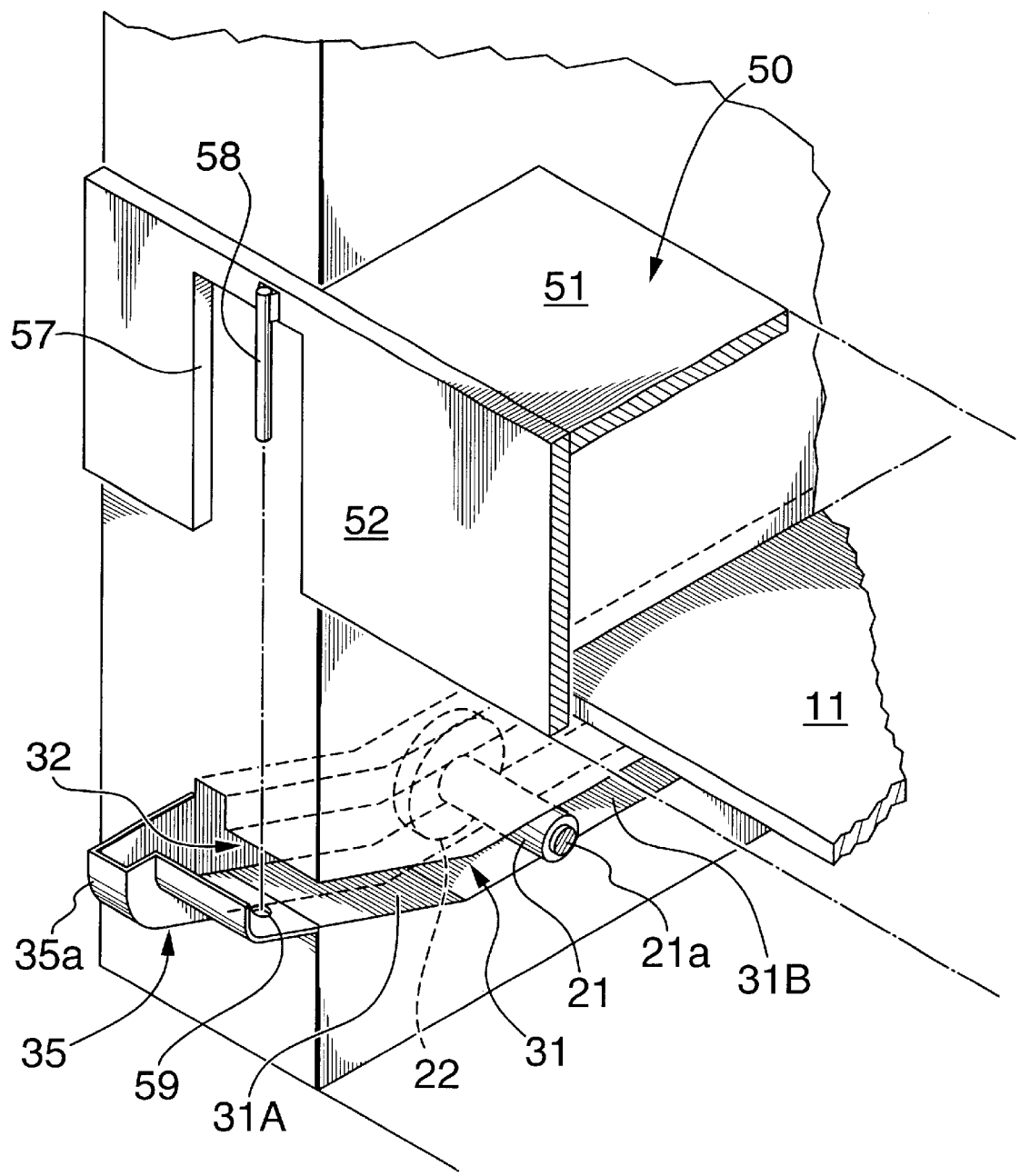
FIG. 5 is a part exploded oblique part cutaway view with parts removed for clarity, of the track on the drivers side at the tail end of the truck box.
Figure 6:
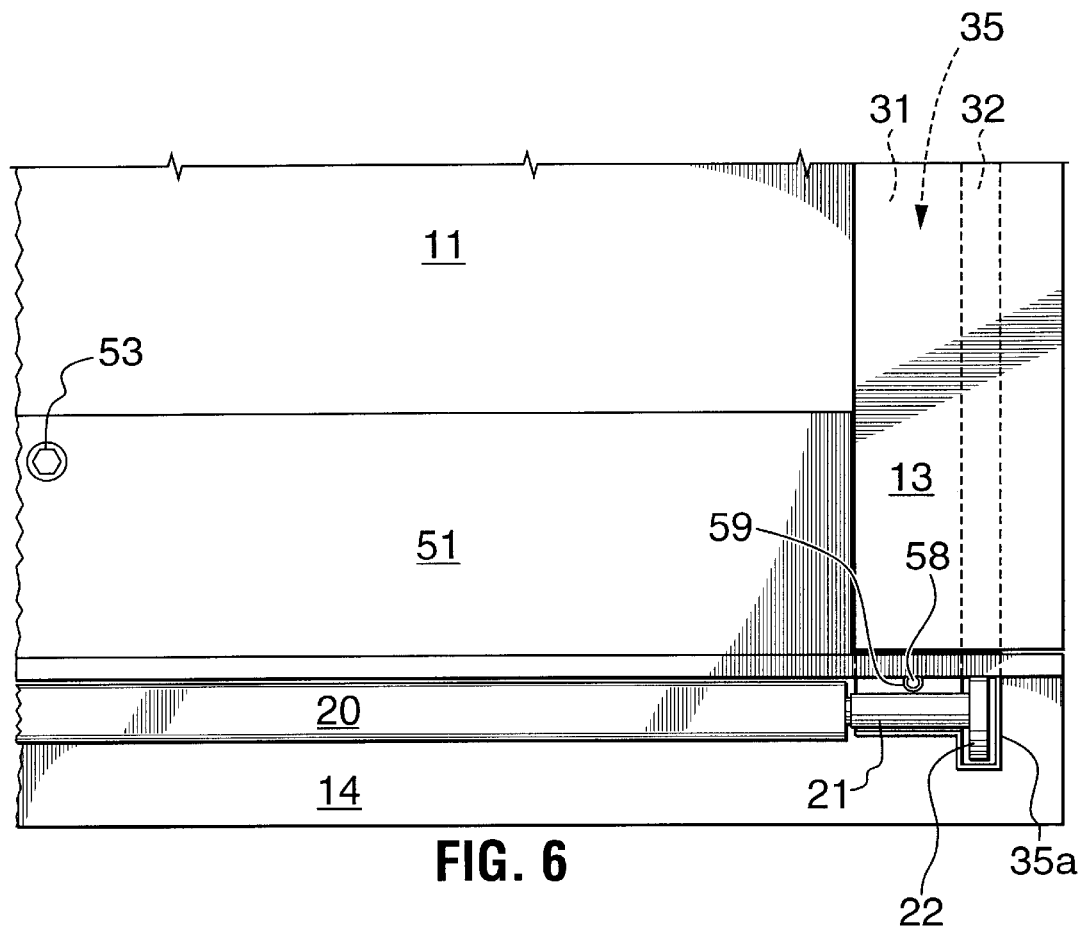
FIG. 6 is sectional view along lines 6—6 of FIG. 2 showing a partial cutaway view of a portion of the passenger side tail end portion of the truck box.
Figure 7:
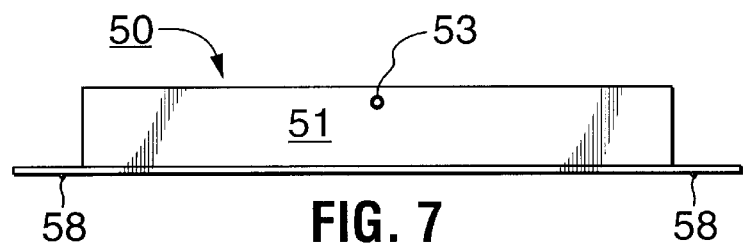
FIG. 7 is plan view of the tail gate slide lock and compartment cover.
Figure 8:
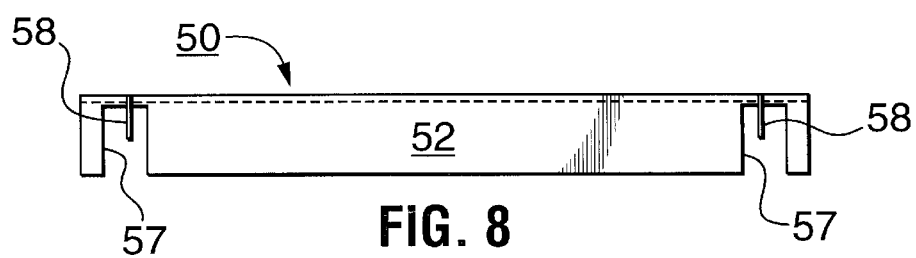
FIG. 8 is an elevational view of FIG. 7.

The truck box has a floor (i.e. bed) 11, a pair of spaced apart opposed vertical side walls 12 and 13, a rear bumper 14 and a tail gate storage compartment 15 located below the floor 11 and which extends forwardly from the tail end 16 of the box to receive therein the tail gate in its fully retracted horizontal position. Each sliding pivot comprises a channel 31 for a roller 21 journalled on a first pin 21A and a second pin 21B secured to and projecting outwardly from an end edge of the tailgate adjacent the lower end thereof. Likewise, as shown in FIG. 4 a roller 40 is journalled on a third pin 41A and a fourth pin 41B secured to and projecting outwardly from an end edge of the tailgate adjacent the lower end thereof. While only the pin alone (projecting into the channel in the track) could provide the sliding pivot the roller provides for a smoother operation. Outboard of the channel 31, and communicating therewith, is a deeper second channel 32 that receives therein a circular plate 22 on the end of the roller (or mounted on the pin 21A of the roller associated therewith). The plate is larger in diameter than the roller 21 and serves as a guide for the tail gate while it is moved on the sliding pivot from one position to the other of a retracted and extended position. In the extended position the tail gate can be pivoted to an upright tail gate closed position cooperatively engaging and latching to the side walls utilizing a selected tail gate latching mechanism (central handle connecting to rods extending to hook and pin arrangement), with the sliding pivot locked in position by means to be described hereinafter.

The channel 31 may be provided in sheet metal, plastic material, or combinations thereof, that defines the opposed side walls of the compartment or be in separate track members 35 as illustrated in the drawings. The compartment maybe defined by components of the vehicle or in a separate unit that attaches to the vehicle. The track members 35 maybe suitably attached in any convenient manner to the vehicle or the sidewalls defining the compartment as the case maybe.

The tail gate is prevented from sliding into the storage compartment by an angle member slide lock 50 providing a simple roller blocking apparatus shown in FIGS. 3, and 5–9 that also has a panel defining a compartment cover to cover the otherwise open rear wall of the storage compartment 15. Referring to these Figures the angle member slide lock 50 includes legs 51 and 52. The leg 51 lies flat on the floor (or a recess therein) and is locked in position by a key lock support member.

Figure 9:
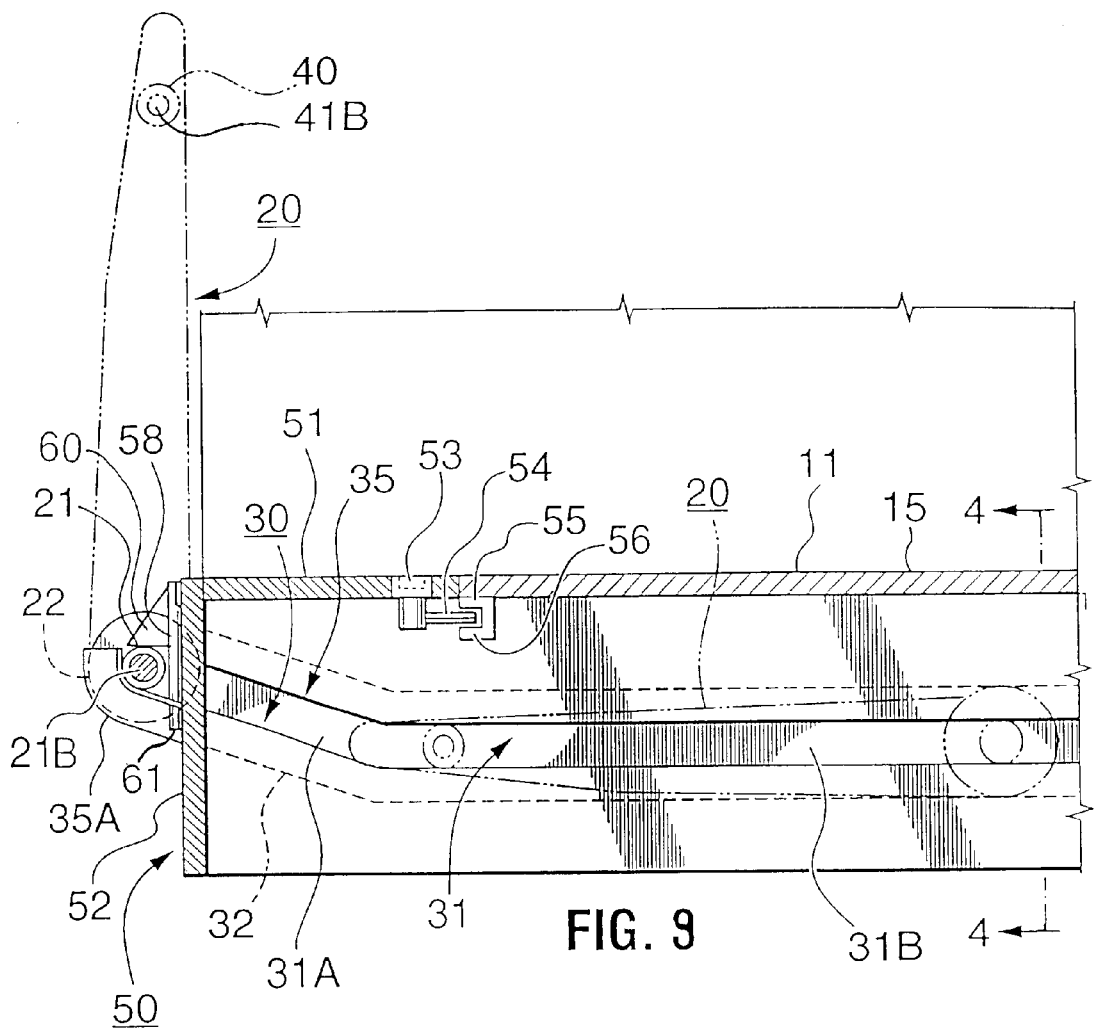
FIG. 9 is a side view of the present invention showing an optional retaining pin including a stop means projecting therefrom to limit upward movement of the roller.
Figure 10:
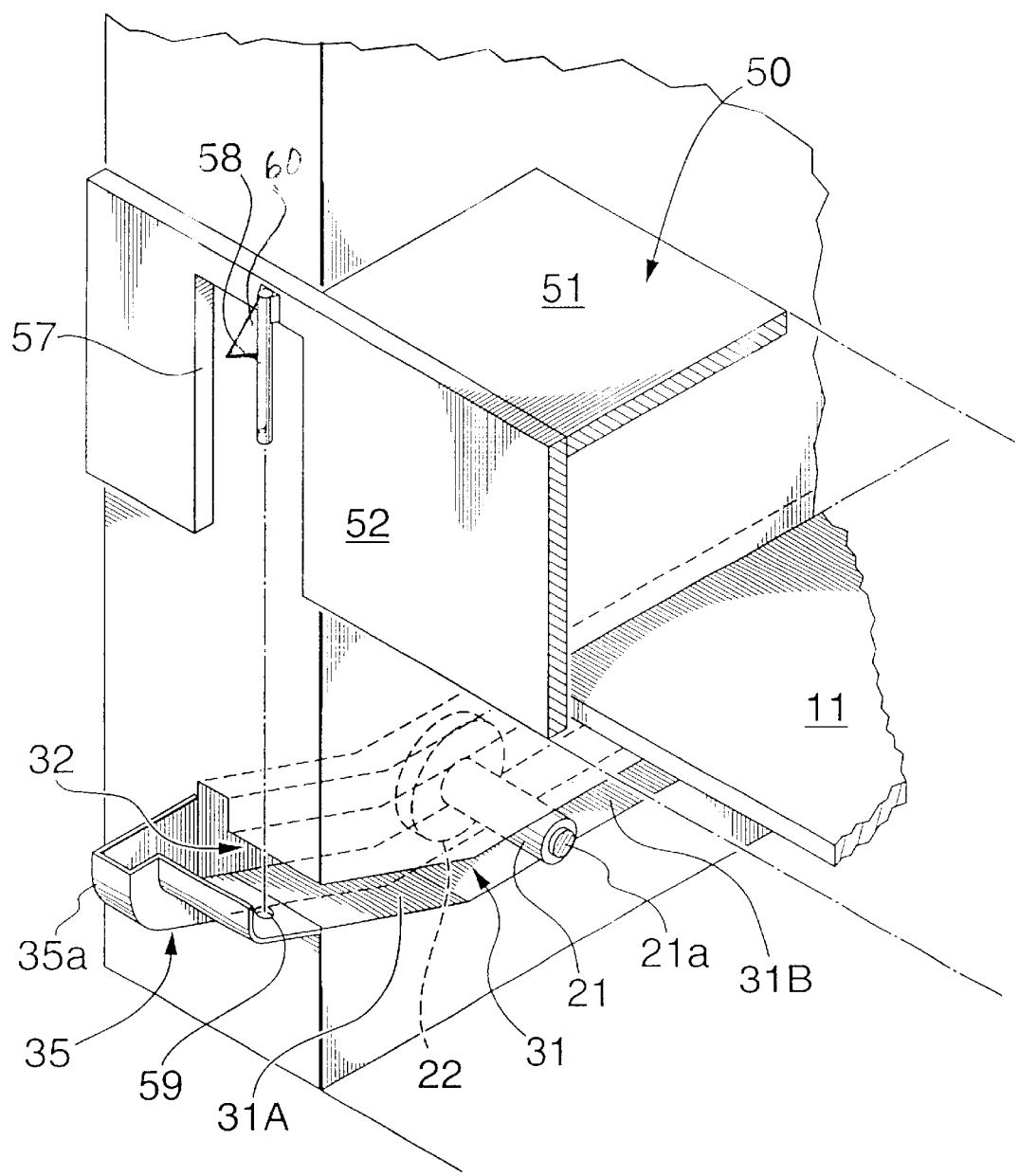
FIG. 10 is an exploded cutaway view of the track on the drivers side at the tail end of the truck box showing the retainer pin with the stop means projection.

The leg 52 is a panel that closes the other wise open rear face of the compartment 15 for the tail gate and has a spaced apart pair of notches 57 for the respective tracks. Attached to the panel is a pair of spaced apart retainer pins 58 that project into respective ones of a pair of apertures 59 in the tracks in a blocking position forwardly of the respective rollers 21 when the tail gate is in its rearmost sliding position. As best shown in FIGS. 9 and 10, the retainer pins 58 may include a stop means 60 projecting or extending outwardly therefrom at an angle engaging the top portion of the roller(s) 21 to limit upward movement thereof and a key or pin 61 extending through a hole in the bottom of the retainer pin 58 to cooperatively engage the bottom of the channel 31 and prevent the retainer pin 58 from working out therefrom.

The tracks 35 each have a rear upwardly turned terminal end portion 35A that is engaged by the roller guide 22 thereby preventing the tail gate from being accidently pulled rearwardly out of the tracks. To remove the tailgate from the tracks the tail gate is slid to its rearmost position and then lifted thereby removing the rollers 21 from the channel 31 in the track. The end of the tracks having the channels 31 for the roller terminate at a suitable position as does the upwardly turned terminal end to allow such action.

To retract the tailgate the blocking member 50 is removed thereby removing the retainer pins 58 from the track holes 59 thus allowing the rollers 21 to slide in the channels 31. When the tail gate is in a partially retracted position it is manipulated into a position whereby the second pair of rollers 40 enter the respective ones of the pair of channels 31 in the tracks 35. The tail gate is now supported on the four spaced apart rollers and with the rollers 21 rolling on the channel sloped portion 31A it is biased by gravity to a fully retracted position. Obviously the location of the second pair of rollers and the sloped portion of the channel are co-related to ensure there is a constant forward bias on the tailgate when in the fully retracted position.

The tail gate is shown as being rearwardly of the truck box side walls. Should one wish to have the tail gate fit between the side walls then the second pair of rollers 40 could readily be slidably mounted in recesses therefore in the edges of the tail gate for movement between a retracted and a projecting position. Alternatively notches could be provided in the sidewalls to receive the respective rollers in which case suitable latching mechanisms could be provided to releasably engage the rollers to retain the tail gate in a closed position.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A tail gate assembly for a vehicle comprising:
 (A) a rectangular panel having a lower longitudinal edge and an upper longitudinal edge and a first side edge and a second side edge opposing said first end edge;
 (B) a first pin and a second pin mounted on the tail gate and projecting outwardly respectively from said first side edge and said second side edge at a position adjacent said lower longitudinal edge;

(C) a third pin and a fourth pin mounted on the tailgate at a position spaced from said first pin and said second pin in a direction toward said upper longitudinal edge;

(D) a pair of spaced apart of members mountable on the vehicle defining a pair of tracks, each one of said tracks having a first longitudinal channel therein slidably receiving therein said first pin and said second pin; and (E) each one of said tracks including a second channel contiguous and communicating with the first channel associated therewith, each one of said second channels being outboard of said respective first channels and of greater depth than said respective first channels for cooperatively engaging means for guiding mounting on said first pin and said second pin in slidable communication therewith.

2. The tail gate assembly for a vehicle as defined in claim 1 wherein said first longitudinal channel and said second longitudinal channel of each one of said tracks include contiguous angular portions disposed relative to one another.

3. The tail gate assembly for a vehicle as defined in claim 1, wherein said means for guiding comprise a disc like member.

4. The tail gate assembly for a vehicle as defined in claim 1, including means for stopping projecting into said first channels at a position blocking sliding movement of said first and second pins in said first channels.

5. The tail gate assembly for a vehicle as defined in claim 1, wherein said means for stopping is a pin.

6. The tail gate assembly for a vehicle as defined in claim 1, including a roller journal mounting on at least two pins selected from the group consisting of said first pin, said second pin, said third pin, and said fourth pin.

7. The tail gate assembly for a vehicle as defined in claim 1, including a means for holding said tail gate in an upright tail gate closed position and preventing said tail gate from sliding into said tracks.

8. The tail gate assembly for a vehicle as defined in claim 7, wherein said means for holding said tail gate in an upright tail gate closed position and preventing said tail gate from sliding into said tracks comprises a roller blocking means.

9. The tail gate assembly for a vehicle as defined in claim 8, wherein said roller blocking means comprises an angle member.

10. A tail gate assembly for a vehicle comprising:

(A) a rectangular panel having a lower longitudinal edge and an upper longitudinal edge and a first side edge and a second side edge opposing said first end edge;

(B) a first pin and a second pin mounted on the tail gate and projecting outwardly respectively from said first side edge and said second side edge at a position adjacent said lower longitudinal edge;

(C) a third pin and a fourth pin mounted on the tailgate at a position spaced from said first pin and said second pin in a direction toward said upper longitudinal edge;

(D) a pair of spaced apart of members mountable on the vehicle defining a pair of tracks, each one of said tracks having a first longitudinal channel therein slidably receiving therein said first pin and said second pin; and (E) said tracks including contiguous angular portions disposed relative to one another.

11. The tail gate assembly for a vehicle as defined in claim 10, wherein each one of said tracks including a second channel contiguous and communicating with the first channel associated therewith, each one of said second channels being outboard of said respective first channels and of greater depth than said respective first channels for cooperatively engaging means for guiding mounting on said first pin and said second pin in slidable communication therewith.

12. The tail gate assembly for a vehicle as defined in claim 10, including means for stopping projecting into said first channels at a position blocking sliding movement of said first and second pins in said first channels.

13. The tail gate assembly for a vehicle as defined in claim 10, wherein said means for stopping is a pin.

14. The tail gate assembly for a vehicle as defined in claim 10, including a roller journal mounting on at least two pins selected from the group consisting of said first pin, said second pin, said third pin, and said fourth pin.

15. The tail gate assembly for a vehicle as defined in claim 10, including a means for holding said tail gate in an an upright tail gate closed position and preventing said tail gate from sliding into said tracks.

16. The tail gate assembly for a vehicle as defined in claim 15, wherein said means for holding said tail gate in an upright tail gate closed position and preventing said tail gate from sliding into said tracks comprises a roller blocking means.

17. The tail gate assembly for a vehicle as defined in claim 16, wherein said roller blocking means comprises an angle member.

18. The tail gate assembly for a vehicle as defined in claim 10, wherein at least a portion of said tracks slopes downwardly in a direction toward a front end of said vehicle.

19. A vehicle tail gate assembly, comprising:

a tail gate having an upper edge, a bottom edge, a first side edge and a second side edge;

a first pair of pins mounted on said first side edge and said second side edge of said tail gate opposite one another and adjacent said bottom edge thereof;

a pair of spaced apart parallel tracks, each of said tracks including at least a first pair of opposing longitudinal channels;

said first pair of pins projecting into its respective first pair of channels, said first pair of pins and said first pair of channels providing sliding pivots whereby said tail gate can, by sliding movement, be moved into and out of said compartment;

a second pair of pins mounted on said first side edge and said second side edge of said tail gate opposite one another at a location spaced from said first pair of pins in a direction toward said upper edge of said tail gate, said second pair of pins being slidable along an initial selected length portion of said first pair of channels; and stop means projecting into said first pair of channels at a position blocking sliding movement of said first pair of pins in said first channels.

20. The tail gate assembly for a vehicle as defined in claim 19, each one of said tracks including a second channel contiguous and communicating with the first channel associated therewith, each one of said second channels being outboard of said respective first channels and of greater depth than said respective first channels for cooperatively engaging means for guiding mounting on said first pin and said second pin in slidable communication therewith.

21. The tail gate assembly for a vehicle as defined in claim 19, wherein said tracks include contiguous angular portions disposed relative to one another.

22. The tail gate assembly for a vehicle as defined in claim 19, including means for stopping projecting into said first pair of channels at a position blocking sliding movement of said first pair of pins in said first channels.

23. The tail gate assembly for a vehicle as defined in claim 19, wherein said means for stopping is a pin..

24. The tail gate assembly for a vehicle as defined in claim 19, including a roller journal mounting on at least two pins selected from the group consisting of said first pin, said second pin, said third pin, and said fourth pin.

25. The tail gate assembly for a vehicle as defined in claim 19, including a means for holding said tail gate in an upright tail gate closed position and preventing said tail gate from sliding into said tracks.

26. The tail gate assembly for a vehicle as defined in claim 25, wherein said means for holding said tail gate in an upright tail gate closed position and preventing said tail gate from sliding into said tracks comprises a roller blocking angle member.

27. The tail gate assembly for a vehicle as defined in claim 19, wherein at least a portion of said tracks slopes downwardly in a direction toward a front end of said vehicle.

28. A vehicle tail gate assembly, comprising:
   a tail gate having an upper edge, a bottom edge, a first side edge and a second side edge;
   a first pair of pins mounted on said first side edge and said second side edge of said tail gate opposite one another and adjacent said bottom edge thereof;
   a pair of spaced apart parallel tracks, each of said tracks including at least a first pair of opposing longitudinal channels;
   said first pair of pins projecting into its respective first pair of channels, said first pair of pins and said first pair of channels providing sliding pivots whereby said tail gate can, by sliding movement, be moved into and out of said compartment;
   a second pair of pins mounted on said first side edge and said second side edge of said tail gate opposite one another at a location spaced from said first pair of pins in a direction toward said upper edge of said tail gate, said second pair of pins being slidable along an initial selected length portion of said first pair of channels; and
   a second pair of channels, each one of said channels contiguous and communicating with a respective one of said first pair of channels, said second pair of channels being deeper in depth than the first pair of channels associated therewith and means for guiding mounting onto said first pair of pins and disposed in said second pair of channels to guide the tail gate during sliding movement thereof.

29. The tail gate assembly for a vehicle as defined in claim 28, including stop means projecting into said first pair of channels at a position blocking sliding movement of said first pair of pins in said first channels.

30. The tail gate assembly for a vehicle as defined in claim 28, wherein said tracks include contiguous angular portions disposed relative to one another.

31. The tail gate assembly for a vehicle as defined in claim 28, wherein said means for stopping is a pin.

32. The tail gate assembly for a vehicle as defined in claim 28, including a roller journal mounting on at least two pins selected from the group consisting of said first pin, said second pin, said third pin, and said fourth pin.

33. The tail gate assembly for a vehicle as defined in claim 28, including a means for holding said tail gate in an upright tail gate closed position and preventing said tail gate from sliding into said tracks.

34. The tail gate assembly for a vehicle as defined in claim 28, wherein said means for holding said tail gate in an upright tail gate closed position and preventing said tail gate from sliding into said tracks comprises a roller blocking angle member.

35. The tail gate assembly for a vehicle as defined in claim 28, wherein at least a portion of said tracks slopes downwardly in a direction toward a front end of said vehicle.

* * * * *